Dec. 31, 1963  T. M. COLE  3,116,360
SWITCH GEAR HOUSING WALL WITH WIREWAY
Filed Sept. 20, 1960  2 Sheets-Sheet 1

INVENTOR.
THOMAS M. COLE
BY
ATTORNEY:

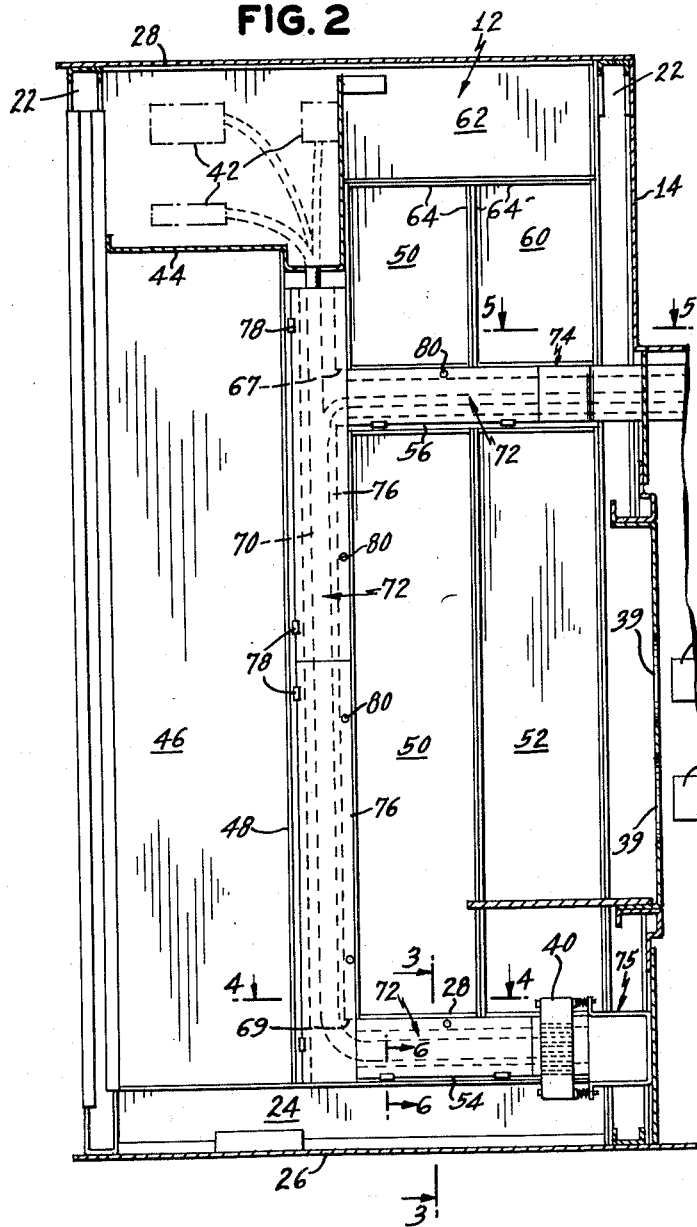
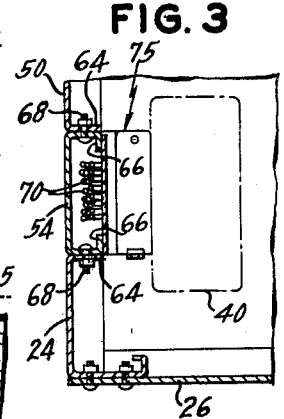
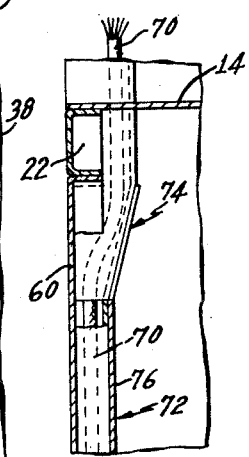
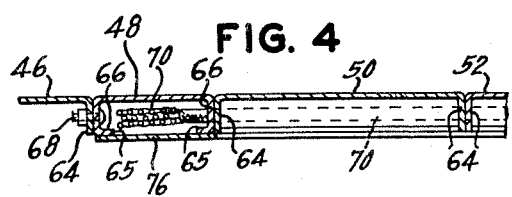
INVENTOR.
THOMAS M. COLE
BY Paul Shearer
ATTORNEY United States Patent Office 3,116,360
Patented Dec. 31, 1963

3,116,360
SWITCH GEAR HOUSING WALL WITH
WIREWAY
Thomas M. Cole, Harrison, N.Y., assignor to Federal
Pacific Electric Company, a corporation of Delaware
Filed Sept. 20, 1960, Ser. No. 57,271
1 Claim. (Cl. 174—72)

This invention relates to enclosed switch gear and more particularly to the housing structure for draw-out switch gear.

Modern electrical generating and distribution facilities require effective protective apparatus for delivering large amounts of energy to one or more loads. The protective equipment used for opening and closing the electrical power circuits must be safe for the protection of the operating personnel. To accomplish these aims, a class of equipment known commonly as enclosed draw-out switch gear has been developed. In equipment of this type the circuit breakers and associated control equipment are contained within a cubicle. The circuit breaker is mounted on casters to facilitate installation and subsequent removal from the cubicle for test or inspection. The associated circuit breaker control and signal equipment is normally mounted within the same enclosure but out of the path of movement of the breakers. Sensing elements and electrical operating elements may be mounted on the breakers themselves. It is therefore necessary to provide interconnection between the draw-out breaker and its control equipment. "Secondary wiring" is used for such interconnection. Heretofore, the connection between the draw-out breaker and the control equipment has been provided by cables or harnessed wires which extend along the side walls of the enclosure. Additional connections have been made similarly to current transformers and the like mounted at the rear of the enclosure.

The cubicles commonly have been formed of steel frame-work with sheet-steel panels or, in the alternative, of heavy-gauge panels suitably united without separate framework. The secondary wiring must be fastened to the cubicle walls, clear of the draw-out circuit breaker.

In practising the present invention, the cubicle walls are made as assemblies of standardized panel members. In this manner, a considerable saving may be effected by utilizing various combinations of standardized panels in the construction of enclosures of various types and sizes. These panels have flanges which are secured together to form a substantially unitary wall. Certain of these panel members are deliberately formed as long and narrow panels. These panels thus complement the other panels in building up a side-wall structure; and the elongated panels with their lateral flanges also constitute a channel which, with a cover, forms a wireway for secondary circuit wiring.

In a more specific aspect, side-wall sectional panels are used that subdivide the width and the height of the cubicle side-wall; and among such panels there are included both horizontal and vertical narrow elongated panels. These elongated panels abut each other and constitute both riser and horizontal branch wireways, limited flange portions being removed to provide a continuous unobstructed bend in the side-wall wiring passage.

An object of this invention is to provide a novel form of switch gear construction adaptable to varied requirements by employing side walls fabricated of panels having integral flanges; and in such switch gear an important object of this invention resides in the provision of a switch gear enclosure wall in which certain of the panels also form integral wireways.

Yet another object of this invention is to eliminate the need for added space and structures for the separate purpose of supporting or containing secondary riser and branch wiring.

In one embodiment of the invention, a switch gear enclosure is provided which has at least one wall fabricated from flanged panels, secured to one another at their flanges. Some of the panels are relatively long and narrow including both horizontally and vertically extending elongated panels all lying within the plane of the side wall. The flanges of abutting horizontal and vertical elongated panels have portions removed at the point of abutment whereby a continuous, unobstructed wireway is formed. Hinged cover elements close and protect the wireway.

The above and other objects, advantages, and novel features will become apparent from the following description, taken in conjunction with the accompanying drawings in which:

FIG. 2 is a side elevation in section of the enclosure in FIG. 1 drawn to larger scale with some parts broken away and other parts omitted in the interest of clarity;

FIG. 3 is a fragmentary vertical sectional view taken along the line 3—3 of FIG. 2;

FIG. 4 is a fragmentary horizontal sectional view taken along the line 4—4 of FIG. 2;

FIG. 5 is a sectional view taken along the line 5—5 of FIG. 2; and

FIG. 6 is a sectional view taken along the line 6—6 of FIG. 2.

Figure 1:
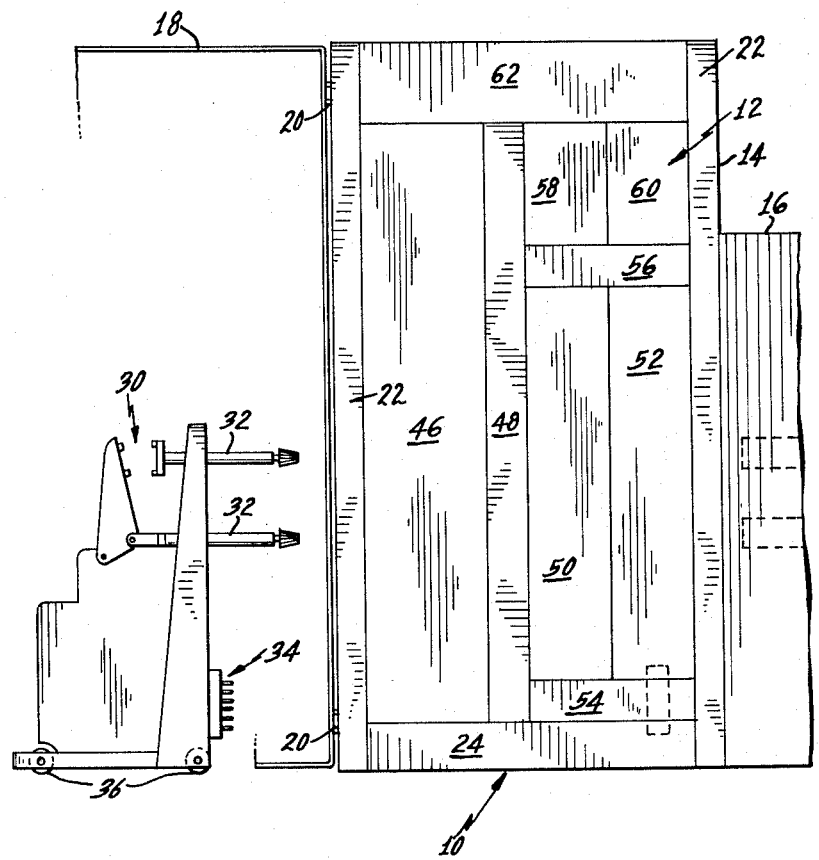
FIG. 1 is a side elevation of an embodiment of the present invention, including an enclosure and a draw-out circuit breaker.

Referring now to the drawings, the switch gear enclosure 10 includes side walls 12 and a rear wall 14. A rear compartment 16, housing additional related equipment, is secured to the rear wall 14. A door 18 is hinged at 20 to vertical channel members 22 (FIG. 2) which, together with horizontal channel members 24, form a door frame. The bottom plate 26 and roof 28 are also secured to the horizontal structural members 24.

Draw-out circuit breaker 30 (shown with its arc chutes removed) is provided with rearwardly extending main terminals 32 and a rearwardly extending secondary terminal block 34. The circuit breaker is adapted to be installed and withdrawn from the enclosure and rides upon casters 36. Referring to FIG. 2, line and load studs 38 are accessible through holes 39 in the rear wall 14 for reception of the primary terminals 32 that carry the usual bridging connectors. Socket 40 is provided adjacent the bottom of the rear wall 14 for receiving the secondary connector 34 of the breaker when the breaker is insereted in the enclosure. Certain of the control equipment for the circuit breaker is identified generally at 42. This equipment is located within an upper compartment of the enclosure 10 as defined by transverse member 44. The exact nature of this control equipment is not necessary for the understanding of this invention and its details are therefore omitted. Additional control equipment such as current transformers and the like (not shown) may be located within the rear compartment 16.

Referring now to FIG. 2 in greater detail, the side wall 12 comprises channels 22 and, in addition, a plurality of panels 46—62 which are provided with vertical flanges 64 and horizontal flanges 66. The individual panels are secured together by bolts 68 to form a substantially self-supporting wall, which is then joined to form the structure of the cubicle or cell 10. Panels 46—62 are prefabricated in quantity and may be employed in the production of side walls for switch gear enclosures of various sizes. By varying the number, sizes and arrangement of standardized panels, walls to meet varied requirements may be obtained easily.

The circuit breaker 30 must be connected to the control equipment 42 and to the equipment contained within the rear compartment 16. The rear equipment is also connected to the control equipment 42. There are a large number of interconnecting wires 70 between the control equipment 42, the rear compartment 16 and secondary socket 40. A duct or wireway 72 maintains them in position, clear of the breaker path. Wireway 72 is composed of the elongated side-wall panels 48, 54, and 56. These panels are provided with only longitudinal flanges 66. These flanges include portions that extend parallel to flanges 64 of the other panels; but flanges 66 additionally include in-turned portions 65. Panel 48 is vertical and panels 56 and 54 are horizontal and are in abutting relation with panel 48. Flanges 66 of the vertical panel 48 have portions removed to form passages 67 and 69 where horizontal panels 54 and 56 abut the vertical panel 48. As can be most clearly seen in FIG. 2, the horizontal panel 56 extends from the vertical panel 48 to rear channel 22 (to which rear wall 14 is fastened); but side-wall panel 56 forms part of a wireway that is off-set at channel 22 so as to extend through the rear wall 14 without interruption. Where wireway 72 passes around the rear channel 22 (as seen in FIG. 5) an extension unit 74, having a similar configuration as the panel 56, is provided. A similar wireway extension 75 is provided between the wireway 72 and the secondary terminal socket 40. The wireway 72 formed by panels 48, 54, and 56 lies within the plane of the side wall and forms a combined vertical and horizontal wireway which includes two right angle bends.

In order to more fully protect the wires 70 within the wireway 72, a multi-part cover 76 is provided. The sections of cover 76 are hinged by split rings 78 to one portion 65 of flange 66 of side-wall panels 48, 54 and 56 and are releasably secured by twist fasteners 80 to the opposite flange portion 65. This arrangement provides a wireway which is incorporated in the side-wall of the cubicle so as to provide adequate wire capacity.

Although one embodiment of the invention has been shown and described, it will be apparent to those skilled in the art that various applications and modifications may be made of the novel features without departing from the spirit and scope of the invention.

What is claimed is:

A housing for switchgear having a side wall including at least tow channels, each of said channels having a flat face portion and longitudinal flanges extending integrally from said flat face portion perpendicular thereto and inwardly relative to said housing, and each said channel having in-turned flanges extending integrally from said longitudinal flanges and parallel to said face portion of said channel, said channels having their flat face portions in a common plane and being arranged so that a first one of said channels abuts a second one of said channels at right angles thereto and intermediate the ends thereof, said side wall further including at least two rectangular panels each having a flat face portion disposed in the plane of the flat face portions of said channels, each of said rectangular panels having integral marginal flanges extending perpendicular to the flat face portion thereof and inwardly relative to said housing, a respective flange of each said panel confronting the opposite longitudinal flanges of said first channel and another flange of each said panel confronting one said longitudinal flange at one side of said second channel, and means securing said confronting flanges together, respectively, said second channel being free of said longitudinal flange in the region of its abutment by said first channel so as to form a continuous wireway from said first channel into said second channel, a cover member extending across each of said channels only from one said longitudinal flange to the other longitudinal flange thereof and said cover member being secured to the corresponding in-turned flanges.

References Cited in the file of this patent

UNITED STATES PATENTS

| 2,573,838 | Fulkerson et al. | Nov. 6, 1951 |
| 2,585,976 | Teeter | Feb. 19, 1952 |
| 2,688,109 | Holland | Aug. 31, 1954 |

FOREIGN PATENTS

| 209,330 | Australia | June 21, 1956 |